United States Patent
Pan et al.

(10) Patent No.: US 9,494,261 B2
(45) Date of Patent: Nov. 15, 2016

(54) CHEMICAL DISPENSE SYSTEM WITH REDUCED CONTAMINATION

(71) Applicant: Taiwan Semiconductor Manufacturing Company, Ltd., Hsin-Chu (TW)

(72) Inventors: Rong-Shyan Pan, Xinpi Township (TW); Yung-Long Chen, Xizhi (TW); Heng-Yi Tzeng, Zhubei (TW); Shao-Yen Ku, Jhubei (TW); Chih-Chiang Tseng, Xinfeng Township (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 164 days.

(21) Appl. No.: 13/764,597

(22) Filed: Feb. 11, 2013

(65) Prior Publication Data
US 2014/0224334 A1 Aug. 14, 2014

(51) Int. Cl.
*F16L 9/18* (2006.01)
*F17D 5/02* (2006.01)
*F16L 11/127* (2006.01)

(52) U.S. Cl.
CPC . *F16L 9/18* (2013.01); *F17D 5/02* (2013.01); *F16L 11/127* (2013.01); *Y10T 137/0318* (2015.04); *Y10T 137/5762* (2015.04); *Y10T 137/87153* (2015.04)

(58) Field of Classification Search
CPC ......... F16L 9/19; F16L 9/18; F16L 2201/30; F16L 11/127; F16L 39/005; F16L 39/00; Y10T 137/87153; Y10T 137/0318; Y10T 137/5762; Y10T 137/87161; F17D 5/00; F17D 5/02; F17D 5/04; F17D 5/08
USPC ......... 137/312, 594, 806–807; 138/104, 114; 361/215
See application file for complete search history.

(56) References Cited

U.S. PATENT DOCUMENTS

| | | | | | |
|---|---|---|---|---|---|
| 1,466,592 | A | * | 8/1923 | King | E03B 7/12 137/375 |
| 2,695,182 | A | * | 11/1954 | Folz | 285/123.1 |
| 2,756,032 | A | * | 7/1956 | Dowell | 165/121 |
| 2,888,042 | A | * | 5/1959 | St John et al. | 138/132 |
| 3,160,785 | A | * | 12/1964 | Munday | 361/215 |
| 3,299,417 | A | * | 1/1967 | Sibthorpe | 340/605 |
| 3,356,108 | A | * | 12/1967 | Johnston | 138/143 |
| 3,410,313 | A | * | 11/1968 | Martin | 138/103 |
| 3,626,987 | A | * | 12/1971 | Bittner | 138/114 |
| 4,120,325 | A | * | 10/1978 | de Putter | F16L 25/01 138/145 |
| 4,215,384 | A | * | 7/1980 | Elson | 361/215 |
| 4,274,549 | A | * | 6/1981 | Germain | 220/86.2 |
| 4,365,404 | A | * | 12/1982 | Castro et al. | 29/455.1 |

(Continued)

FOREIGN PATENT DOCUMENTS

CN 1995797 A * 7/2011

*Primary Examiner* — Craig Schneider
*Assistant Examiner* — David Colon Morales
(74) *Attorney, Agent, or Firm* — Slater Matsil, LLP

(57) ABSTRACT

An apparatus includes a production tool and a pipe connected to the production tool. The pipe includes an inner pipe formed of a metal-free material, an outer pipe encircling the inner pipe, and an inlet connected to a channel between the inner pipe and the outer pipe. The apparatus further includes a chemical supply system connected to the pipe. The chemical supply system is configured to supply a chemical through a channel encircled by the inner pipe to the production tool.

20 Claims, 2 Drawing Sheets

(56) References Cited

U.S. PATENT DOCUMENTS

| | | | |
|---|---|---|---|
| 4,449,098 A * | 5/1984 | Nakamura et al. | 324/326 |
| 4,461,347 A * | 7/1984 | Layton et al. | 165/133 |
| 4,630,789 A * | 12/1986 | Rosenberg | 244/135 R |
| 4,635,162 A * | 1/1987 | McLaughlin | F16L 25/01 174/84 S |
| 4,644,780 A * | 2/1987 | Jeter | 73/40.5 R |
| 4,653,541 A * | 3/1987 | Oehlschlaeger | F16L 9/18 138/104 |
| 4,723,441 A * | 2/1988 | Sweeney | 73/40.5 R |
| 4,786,088 A * | 11/1988 | Ziu | 285/123.1 |
| 4,960,167 A * | 10/1990 | Stenlund | 165/286 |
| 5,081,326 A * | 1/1992 | Usui | 174/47 |
| 5,127,441 A * | 7/1992 | Rains | 138/114 |
| 5,228,472 A * | 7/1993 | Ougiya | F16K 41/12 137/312 |
| 5,267,447 A * | 12/1993 | Yamamoto | 62/50.7 |
| 5,267,670 A * | 12/1993 | Foster | 222/1 |
| 5,277,455 A * | 1/1994 | Graves | F16L 23/167 285/123.1 |
| 5,301,721 A * | 4/1994 | Hartmann | 141/59 |
| 5,375,457 A * | 12/1994 | Trapp | 73/40.7 |
| 5,382,359 A * | 1/1995 | Brandt | B01D 27/08 210/243 |
| 5,611,373 A * | 3/1997 | Ashcraft | 138/113 |
| 5,868,898 A * | 2/1999 | Liu et al. | 156/345.18 |
| 5,884,657 A * | 3/1999 | Srock | 137/312 |
| 5,931,184 A * | 8/1999 | Armenia et al. | 137/312 |
| 6,026,843 A * | 2/2000 | Pozniak | F17D 1/08 137/312 |
| 6,070,615 A * | 6/2000 | Chen | 138/33 |
| 6,123,112 A * | 9/2000 | Wagner | 138/114 |
| 6,129,107 A * | 10/2000 | Jackson | 137/312 |
| 6,135,138 A * | 10/2000 | Richards, Jr. | 137/312 |
| 6,180,954 B1 * | 1/2001 | Verrier et al. | 250/492.21 |
| 6,305,407 B1 * | 10/2001 | Selby | 137/312 |
| 6,446,671 B2 * | 9/2002 | Armenia et al. | 138/109 |
| 6,464,948 B2 * | 10/2002 | Honma | C23C 8/12 422/186.08 |
| 6,671,162 B1 * | 12/2003 | Crouse | 361/215 |
| 6,821,906 B2 * | 11/2004 | Wada et al. | 438/708 |
| 6,955,211 B2 * | 10/2005 | Ku | F28D 7/106 165/47 |
| 7,000,643 B2 * | 2/2006 | St. Onge et al. | 138/98 |
| 7,042,235 B2 * | 5/2006 | Strackbein et al. | 324/686 |
| 7,111,646 B2 * | 9/2006 | Sato | 138/137 |
| 7,302,936 B2 * | 12/2007 | Stolarz et al. | 123/468 |
| 7,314,239 B2 * | 1/2008 | Okamoto | F16L 47/04 285/331 |
| 7,357,144 B2 * | 4/2008 | Im et al. | 137/15.04 |
| 7,857,553 B2 * | 12/2010 | Tsuchie et al. | 406/193 |
| 2002/0088490 A1 * | 7/2002 | Selby et al. | 137/312 |
| 2004/0084083 A1 * | 5/2004 | Pearson | 137/312 |
| 2005/0166666 A1 * | 8/2005 | Tsukagoshi | 73/49.1 |
| 2006/0096314 A1 * | 5/2006 | Nakamura et al. | 62/498 |
| 2009/0071400 A1 * | 3/2009 | Soyland et al. | 118/323 |
| 2009/0173364 A1 * | 7/2009 | Hamada et al. | 134/30 |
| 2010/0038012 A1 * | 2/2010 | Tucker et al. | 156/86 |
| 2010/0224256 A1 * | 9/2010 | Tseng et al. | 137/2 |

* cited by examiner

CHEMICAL DISPENSE SYSTEM WITH REDUCED CONTAMINATION

BACKGROUND

In various manufacturing steps for forming integrated circuits, chemicals are used, for example, in etching and cleaning steps. A chemical is typically transported from a chemical supply system to a production tool, in which the chemical is used. Conventionally, chemicals are transported through pipes formed of stainless steel. It was found that the metals in the stainless steel contaminate the chemicals that are transported in the pipes. The production yield is hence adversely affected.

BRIEF DESCRIPTION OF THE DRAWINGS

For a more complete understanding of the embodiments, and the advantages thereof, reference is now made to the following descriptions taken in conjunction with the accompanying drawings, in which.

DETAILED DESCRIPTION OF ILLUSTRATIVE EMBODIMENTS

The making and using of the embodiments of the disclosure are discussed in detail below. It should be appreciated, however, that the embodiments provide many applicable concepts that can be embodied in a wide variety of specific contexts. The specific embodiments discussed are illustrative, and do not limit the scope of the disclosure.

A chemical dispense system and the method of dispensing chemicals using the chemical dispense system are provided in accordance with various exemplary embodiments. The variations and the operation of the chemical dispense system in accordance with exemplary embodiments are discussed. Throughout the various views and illustrative embodiments, like reference numbers are used to designate like elements.

Figure 1:
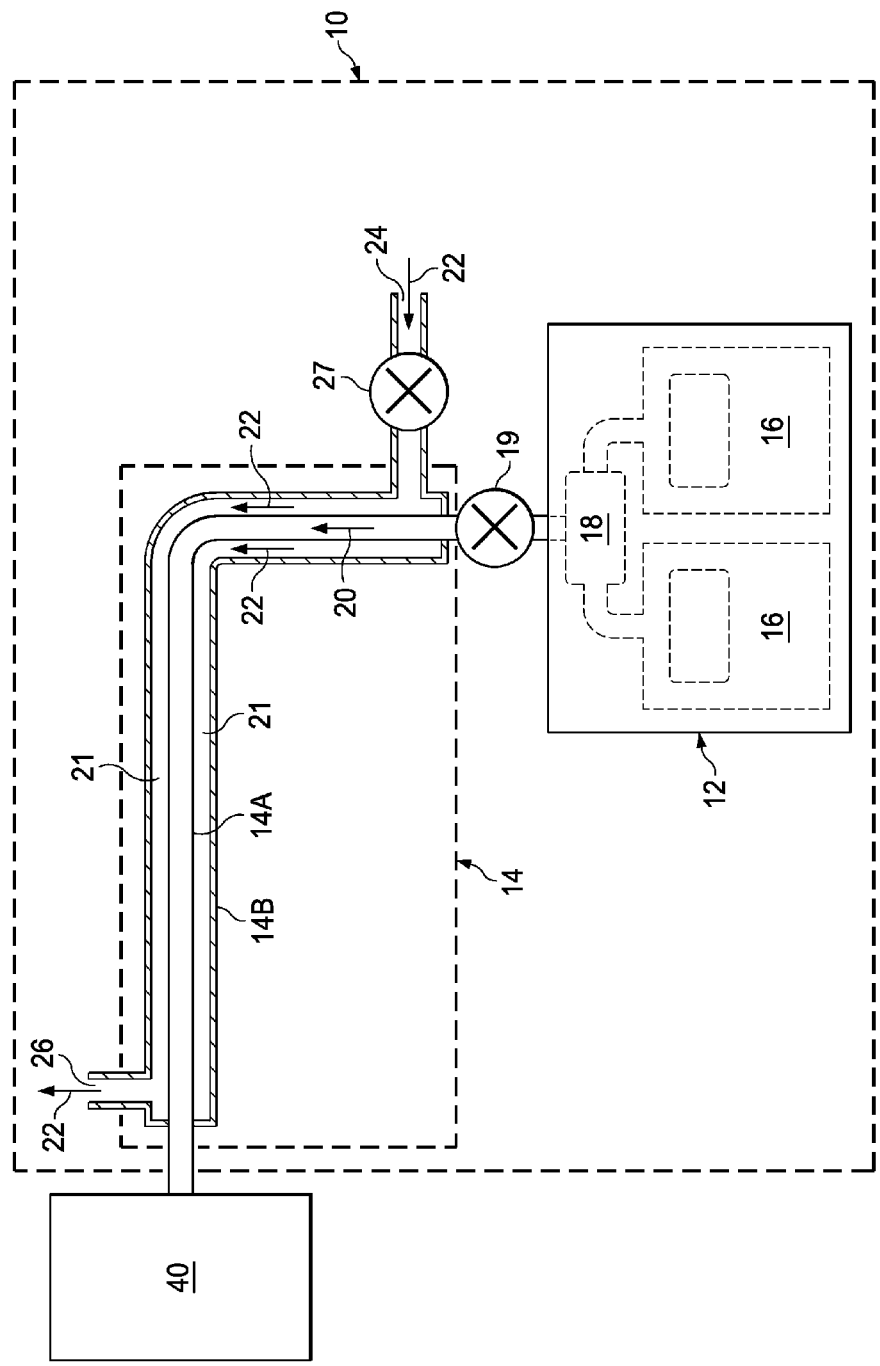
FIG. 1 illustrates a chemical dispense system in accordance with some exemplary embodiments.

FIG. 1 illustrates chemical dispense system 10, which includes chemical supply system 12, and pipe 14 connected to chemical supply system 12. In some embodiments, chemical supply system 12 includes one or a plurality of chemical storages 16, which is configured to store one or a plurality of types of chemicals. Depending on the chemicals to be supplied by chemical supply system 12, chemical supply system 12 may include mixer 18 configured to mix the chemicals stored in chemical storages 16, and the resulting mixed chemical 20 is supplied to pipe 14. Alternatively, chemical supply system 12 stores chemical 20, and supplies chemical 20 to pipe 14 without mixing. Furthermore, chemical supply system 12 may include pump 19, which is connected to pipe 14. Pump 19 is configured to pump chemical 20 from chemical supply system 12 into pipe 14.

Production tool 40 is connected to pipe 14. Production tool 40 may comprise an etcher, a wet cleaner, or any other production tool that uses chemical 20 in integrated circuit manufacturing processes. In some exemplary embodiments, chemical 20 flows to production tool 40 in a liquid form. Alternatively, chemical 20 flows in pipe 14 in a low-pressure gaseous form, with the pressure in pipe 14 close to one atmosphere, for example. Chemical 20 may be an organic solvent in some embodiments. Furthermore, chemical 20 may be ignitable, and may vaporize. In some exemplary embodiments, chemical 20 includes isopropanol ($C_3H_8O$), which when transported, may be in the form of pure isopropanol or substantially pure isopropanol. In alternative embodiments, chemical 20 may comprise isopropanol dissolved in water, alcohol, ether, or chloroform. In other embodiments, chemical 20 includes propylene glycol monomethylether, propylene glycol monomethylether acetate, butyl acetate, or the like.

Figure 2:
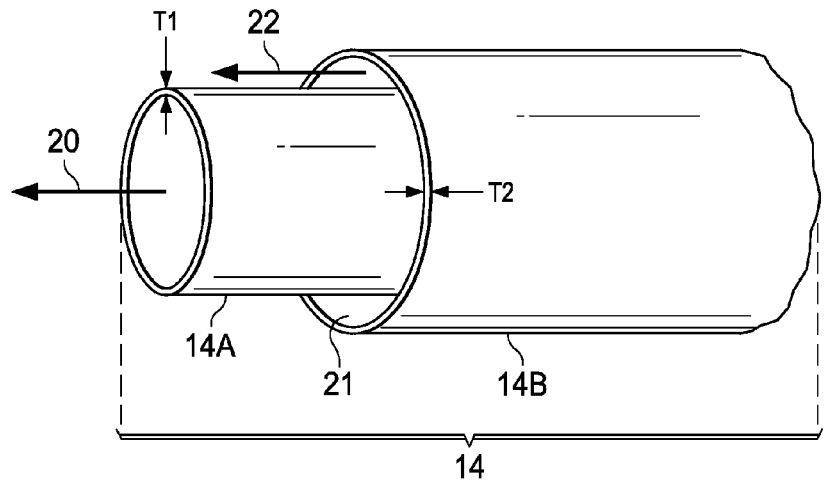
FIG. 2 illustrates a perspective view of a portion of a pipe in accordance with some exemplary embodiments, wherein the pipe is used to connect the chemical dispense system to a production tool.

FIG. 2 illustrates a perspective view of a portion of pipe 14. Pipe 14 includes inner pipe 14A, and outer pipe 14B encircling inner pipe 14A. Outer pipe 14B is spaced apart from inner pipe 14A, with a ring-shaped space there between. In some embodiments, inner pipe 14 is formed of a material that is free from metal, and hence inner pipe 14A is referred to as a metal-free inner pipe throughout the description. The inner surface of inner pipe 14A is also free from metal. Chemical 20 flows in the channel encircled by inner pipe 14A. Hence, chemical 20, when flowing in the channel, is in contact with the metal-free inner surface. Furthermore, inner pipe 14 may be formed of a dielectric material, although it may also be electrical conductive (or semi-conductive). Inner pipe 14A may also be formed of an organic material. In some exemplary embodiments, inner pipe 14A comprises Perfluoroalkoxy (PFA). In alternative embodiments, inner pipe 14A comprises Polytetrafluoroethylene (PTFE, with a chemical formula being $(C_2F_4)_n$), which is also known as Teflon (a register trademark of Dupont Co.). In yet alternative embodiments, inner pipe 14A comprises Non-Explosion Perfluoroalkoxy (NE-PFA). In yet alternative embodiments, inner pipe 14A comprises Anti-Static Perfluoroalkoxy (AS-PFA). Accordingly, when flowing in pipe 14, Chemical 20 may be in contact with PFA, PTFE, NE-PFA, AS-PFA, or the like. Inner pipe 14A may have thickness T1 between about 1 mm and about 4 mm. It is appreciated, however, that the values recited throughout the description are merely examples, and may be changed to different values.

In some embodiments, outer pipe 14B is also formed of a material that is free from metal. Furthermore, outer pipe 14B may be formed of a dielectric material, although it may also be electrical conductive (or semi-conductive). Outer pipe 14B may also be formed of an organic material. In some exemplary embodiments, outer pipe 14B comprises PFA, PTFE, NE-PFA, or the like. Outer pipe 14B may also be a metal pipe, which may be formed of stainless steel, aluminum, copper, or the like. Outer pipe 14B may have thickness T2 between about 1 mm and about 4 mm.

The channel 21, which is between inner pipe 14A and outer pipe 14B, may be filled with fluid 22. Fluid 22 is configured to conduct electrical charges that may be generated due to the static on inner pipe 14A and/or outer pipe 14B. In some embodiments, fluid 22 comprises water (which includes ions that may conduct electrical charges), wet nitrogen (a mixed gas of water vapor and nitrogen), or the like. Other types of fluid that may conduct charges and do not form ignitable vapors may also be dispensed in channel 21.

Referring back to FIG. 1, pipe 14 includes inlet and outlet 24 and 26. Each of inlet and outlet 24 and 26 may be used as an inlet or an outlet, and hence each of inlet and outlet 24 and 26 is referred as an inlet/outlet hereinafter. In some embodiments, fluid 22 is injected into channel 21 through a one of inlets/outlets 24 and 26, and is retrieved from the other one of inlets/outlets 24 and 26. In accordance with some embodiment, pump 27 is connected to one of inlets/outlets 24 and 26, and is configured to pump fluid 22 into channel 21. The injection and the retrieval of fluid 22 may be performed when chemical 20 flows in inner pipe 14A, and/or before and after chemical 20 is transported.

Figure 3:
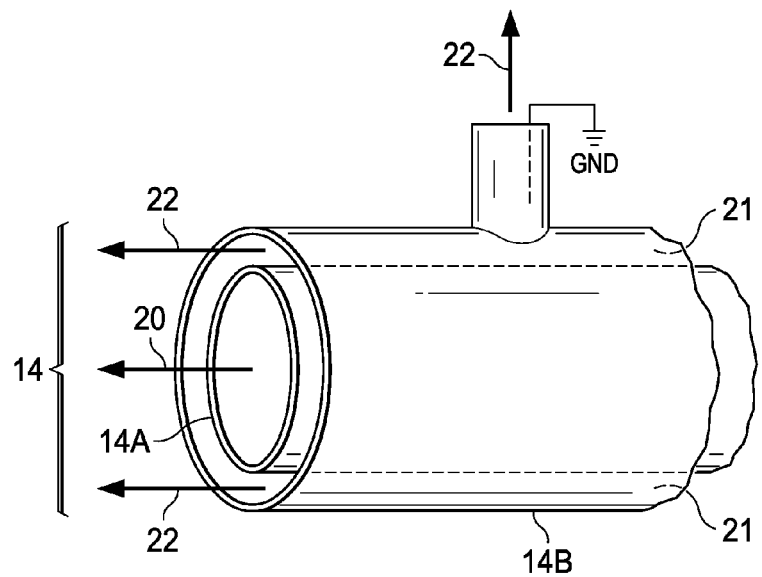
FIG. 3 illustrates a perspective view of a portion of a pipe and an inlet/outlet connected to a pipe in accordance with some exemplary embodiments, wherein the pipe is used to connect the chemical dispense system to a production tool.

FIG. 3 illustrates a perspective view illustrating the flow of fluid 22 in channel 21. Since inner pipe 14A and possibly outer pipe 14B may be formed of dielectric materials, static charges may accumulate on inner pipe 14A, and possibly on outer pipe 14B. If channel 21 is not filled with the conductive fluid, chemical 20 may enter into channel 21 if a leakage occurs in inner pipe 14A, and chemical 20 is leaked out of inner pipe 14A into channel 21. The leaked chemical 20 may be ignited by the static charges. The filling of channel 21 with fluid 22, however, conducts away the static charges, and hence eliminates the possibility of fire. Furthermore, fluid 22 occupies channel 21 that otherwise may cause leaked chemical 20 to evaporate. In addition, fluid 22 may also dissolve the leaked chemical 20 when leakage occurs. This further reduces the possibility of fire.

In alternative embodiments, fluid 22 remains still in channel 21, and does not flow when chemical 20 flows in inner pipe 14A. In these embodiments, fluid 22 may be electrically grounded to electrical ground GND, as schematically illustrated in FIG. 3.

Figure 4:
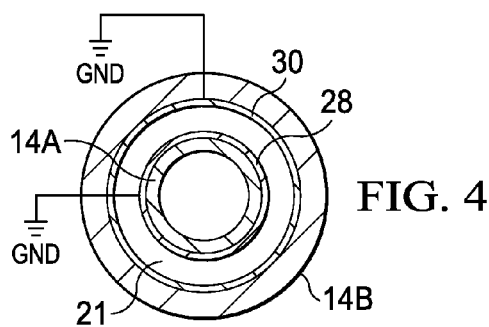
FIG. 4 illustrates a cross-sectional view of a pipe in accordance with some exemplary embodiments.

FIG. 4 schematically illustrates a grounding scheme. The grounding may be performed by coating conductive layer 28 on the outer surface of inner pipe 14A and/or conductive layer 30 on the inner surface of outer pipe 14B, and connecting conductive layer 28 and/or 30 to electrical ground GND. In these embodiments, inner pipe 14A may be a NE-PFA pipe or an AS-PFA pipe. In alternative embodiments, a metal line (not shown) may be placed in channel 21, and connected to electrical ground GND. Conductive coating 28 and 30 and/or the metal line may thus conduct static charges to ground, with fluid 22 acting as a conductive medium. This eliminates the possibility that static charges accumulate on inner pipe 14A and outer pipe 14B.

In the embodiments of the present disclosure, by using the metal-free inner pipe 14A to transport the chemicals that are used in the integrated manufacturing processes, the metal contamination problem that otherwise would occur (if metals (such as stainless steel pipes) are used for transporting chemicals) is avoided. The fluid in channel 21 (FIG. 1) may help discharge the static charges that may accumulate on inner pipe 14A.

In accordance with some embodiments, an apparatus includes a production tool and a pipe connected to the production tool. The pipe includes an inner pipe formed of a metal-free material, an outer pipe encircling the inner pipe, and an inlet connected to a channel between the inner pipe and the outer pipe. The apparatus further includes a chemical supply system connected to the pipe. The chemical supply system is configured to supply a chemical through a channel encircled by the inner pipe to the production tool.

In accordance with other embodiments, an apparatus includes a production tool and a pipe connected to the production tool. The pipe includes an inner pipe formed of a metal-free dielectric material, an outer pipe encircling the inner pipe, an inlet connected to a first channel between the inner pipe and the outer pipe, and an outlet connected to the channel. A chemical supply system is connected to the pipe. The chemical supply system is configured to supply a chemical to the production tool through a second channel encircled by the inner pipe.

In accordance with yet other embodiments, a method includes supplying a chemical to a production tool through a pipe connected to the production tool, wherein the pipe includes an inner pipe formed of a metal-free material, with the chemical flows in the inner pipe. The pipe further includes an outer pipe encircling the inner pipe. The method further includes dispensing a conductive fluid into a channel between the inner pipe and the outer pipe.

Although the embodiments and their advantages have been described in detail, it should be understood that various changes, substitutions and alterations can be made herein without departing from the spirit and scope of the embodiments as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. An apparatus comprising:
    a production tool configured to manufacture integrated circuits;
    a pipe connected to the production tool, wherein the pipe comprises:
        an inner pipe with a first channel therein, wherein the inner pipe is formed of a metal-free material;
        a first metal layer coated on an outer surface of the inner pipe;
        an outer pipe comprising a dielectric material encircling the inner pipe;
        a second metal layer coated on an inner surface of the outer pipe, wherein the first metal layer and the second metal layer are electrically grounded;
        an electrical conductive fluid in a second channel between the inner pipe and the outer pipe, wherein the electrical conductive fluid is configured to sufficiently conduct electrical charges on the inner pipe away from the inner pipe; and
        an inlet connected to the second channel; and
    a chemical supply system connected to the pipe, wherein the chemical supply system is configured to supply a chemical through the first channel while the electrical conductive fluid is in the second channel.

2. The apparatus of claim 1, wherein the electrical conductive fluid comprises wet nitrogen comprising water vapor and nitrogen gas.

3. The apparatus of claim 2, wherein the electrical conductive fluid is electrically grounded.

4. The apparatus of claim 1 further comprising a metal line placed in the second channel and electrically grounded.

5. The apparatus of claim 1, wherein, the electrical conductive fluid is configured to dissolve and conduct the chemical leaked from the inner pipe away from the second channel when the chemical is supplied through the first channel.

6. The apparatus of claim 1, wherein the chemical supply system comprises:
 a first chemical storage configured to store a first chemical;
 a second chemical storage configured to store a second chemical;
 a mixer connected to the first chemical storage and the second chemical storage, wherein the mixer is configured to mix the first chemical and the second chemical, thereby forming the chemical supplied to the first channel;
 wherein the apparatus further comprises:
  a first pump proximate a first end of the outer pipe and connected to the mixer, wherein the first pump is configured to pump the chemical from the mixer into the first channel.

7. The apparatus of claim 6, wherein the inlet is disposed proximate the first end of the outer pipe, wherein the apparatus further comprises a second pump connected between the outer pipe and the inlet, wherein the second pump is configured to pump the electrical conductive fluid supplied at the inlet into the second channel of the pipe.

8. The apparatus of claim 7, wherein a second end of the outer pipe is disposed proximate the production tool, wherein the apparatus further comprises an outlet proximate the second end of the outer pipe, wherein the outlet is configured to discharge the electrical conductive fluid out of the second channel.

9. The apparatus of claim 8, wherein the second channel comprises a continuous channel between the first end of the outer pipe and the second end of the outer pipe.

10. An apparatus comprising:
 a production tool configured to manufacture integrated circuits;
 a pipe connected to the production tool, wherein the pipe comprises:
  an inner pipe, wherein the inner pipe is formed of a metal-free dielectric material, with a first channel in the inner pipe and a first conductive coating on an outer surface of the inner pipe, wherein the first conductive coating is electrically grounded;
  an outer pipe encircling the inner pipe, with a second channel between the inner pipe and the outer pipe, wherein the outer pipe is electrically grounded; and
  an electrical conductive fluid in the second channel, wherein the electrical conductive fluid comprises wet nitrogen comprising water vapor and nitrogen gas; and
 a chemical supply system connected to the pipe, wherein the chemical supply system is configured to supply a chemical to the production tool through the first channel while the electrical conductive fluid is in the second channel.

11. The apparatus of claim 10, wherein the outer pipe comprises a dielectric material, and has a second conductive coating coated on an inner surface of the outer pipe, wherein the second conductive coating is electrically grounded.

12. The apparatus of claim 10, wherein the inner pipe comprises a dielectric material, with an inner surface of the inner pipe being a surface of the dielectric material, and wherein the outer pipe is metal.

13. The apparatus of claim 10, wherein the inner pipe comprises a material selected from the group consisting of Polytetrafluoroethylene (PTFE), Non-Explosion Perfluoroalkoxy (NE-PFA), and Anti-Static Perfluoroalkoxy (AS-PFA), and wherein the outer pipe comprises a material selected from the group consisting of stainless steel, copper, and aluminum.

14. The apparatus of claim 13, wherein a first thickness of the inner pipe is in a range between about 1 mm and about 4 mm, and a second thickness of the outer pipe is in a range between about 1 mm and about 4 mm.

15. The apparatus of claim 10, wherein the second channel comprises a continuous conduit for the electrical conductive fluid between a first end of the outer pipe proximate the chemical supply system and a second end of the outer pipe proximate the production tool.

16. A method comprising:
 supplying a chemical to a production tool through a pipe connected to the production tool, wherein the production tool is configured to manufacture integrated circuits, and wherein the pipe comprises:
  an inner pipe, wherein the inner pipe is formed of a first dielectric material, wherein an outer surface of the inner pipe is coated with a first conductive coating that is electrically grounded, and wherein the chemical flows in the inner pipe; and
  an outer pipe formed of a second dielectric material encircling the inner pipe, wherein an inner surface of the outer pipe is coated with a second conductive coating that is electrically grounded; and
 dispensing a conductive fluid into a channel between the inner pipe and the outer pipe during the supplying the chemical.

17. The method of claim 16 further comprising, at a time the chemical flows in the inner pipe:
 injecting the conductive fluid into the channel between the inner pipe and the outer pipe through an inlet of the pipe; and
 retrieving the conductive fluid out of the channel between the inner pipe and the outer pipe through an outlet of the pipe.

18. The method of claim 16, wherein the conductive fluid comprises wet nitrogen or ionized water.

19. The method of claim 16 further comprising conducting charges in the conductive fluid to an electrical ground through a metal line placed in the channel between the inner pipe and the outer pipe.

20. The method of claim 16, wherein the conductive fluid is dispensed into and conducted away from the channel during the supplying the chemical, with the conductive fluid configured to dissolve the chemical.

* * * * *